United States Patent [19]
Klein et al.

[11] 4,084,615
[45] Apr. 18, 1978

[54] DYEING AND PRINTING OF MATERIALS

[75] Inventors: Norman E. Klein, Inman; William H. Stewart, Jr., Spartanburg, both of S.C.

[73] Assignee: Milliken Research Corporation, Spartanburg, S.C.

[21] Appl. No.: 734,076

[22] Filed: Oct. 20, 1976

Related U.S. Application Data

[63] Continuation of Ser. No. 493,186, Jul. 30, 1974, abandoned, which is a continuation-in-part of Ser. No. 430,450, Jan. 3, 1974, abandoned.

[51] Int. Cl.² ............................................. F17D 3/00
[52] U.S. Cl. ................. 137/624.11; 118/314; 335/259; 336/171
[58] Field of Search ................ 137/596.16, 624.11; 118/313, 314; 251/65, 137; 335/159, 162, 259; 336/171

[56] References Cited
U.S. PATENT DOCUMENTS

| | | | |
|---|---|---|---|
| 1,090,902 | 3/1914 | Beckwith | 291/65 |
| 1,577,421 | 3/1926 | Hazeltine | 336/171 |
| 1,655,048 | 1/1928 | De Monte | 336/171 |
| 2,804,764 | 9/1957 | Runton | 118/313 |
| 3,068,886 | 12/1962 | Hixon et al. | 137/624.11 |
| 3,160,052 | 12/1964 | Von Gunten | 335/259 |
| 3,287,498 | 11/1966 | Raub | 336/171 |
| 3,393,411 | 7/1968 | McElveen | 8/14 |
| 3,443,878 | 5/1969 | Weber et al. | 8/14 |
| 3,570,275 | 3/1971 | Weber et al. | 68/183 |
| 3,800,257 | 3/1974 | Schmitt | 335/259 |

*Primary Examiner*—William R. Cline
*Assistant Examiner*—H. Jay Spiegel
*Attorney, Agent, or Firm*—H. William Petry; Glen M. Burdick

[57] ABSTRACT

A compact arrangement of electromagnetically operated valves utilized for controlling the flow of deflecting air in a dye jet printing apparatus, and wherein the valves are mounted on a plurality of supporting cards and are positioned in a geometric lattice thereon so that the magnetic field created in each valve during its operation intersects the magnetic axis of its adjacent valves at a generally right angle thereby minimizing interference between valves during their operation.

5 Claims, 10 Drawing Figures

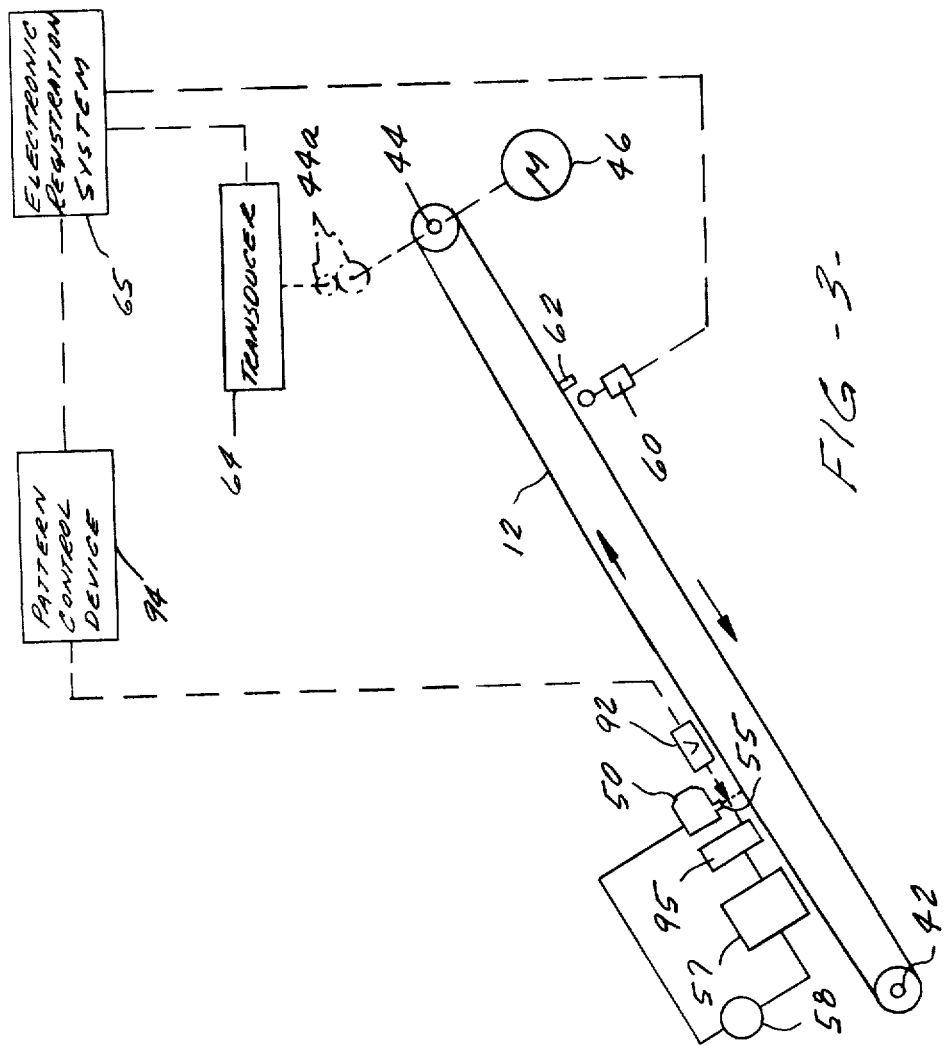
FIG-3-

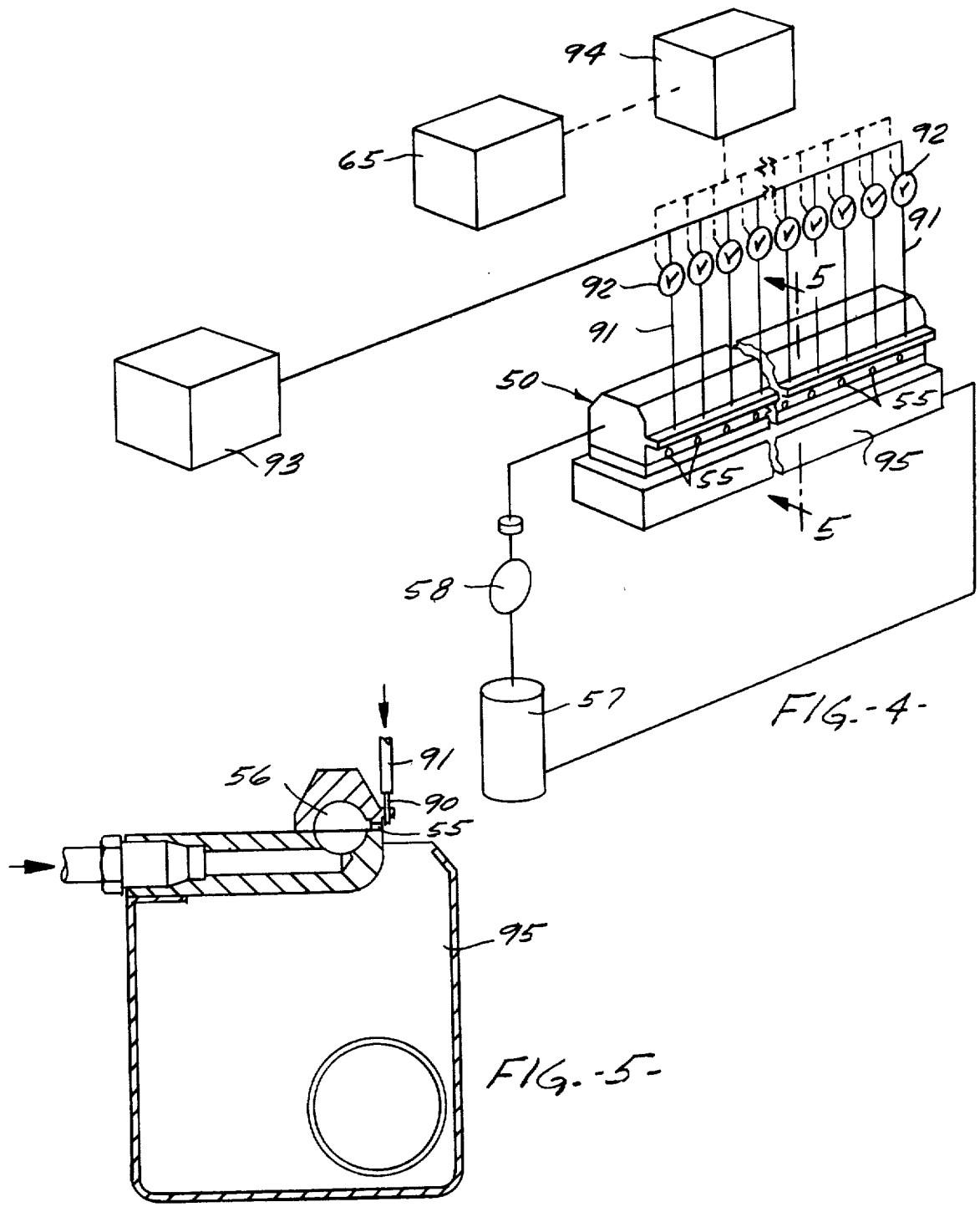
FIG.-4-
FIG.-5-

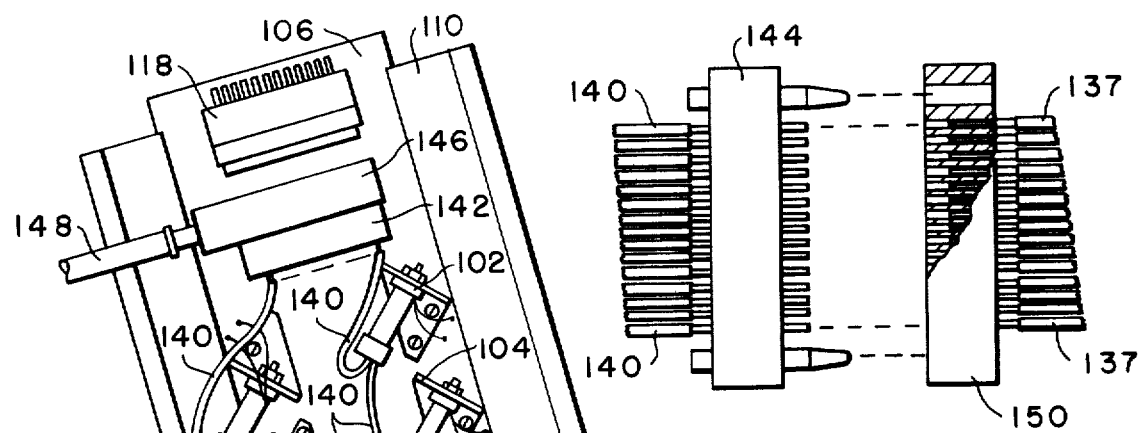
FIG.-8-
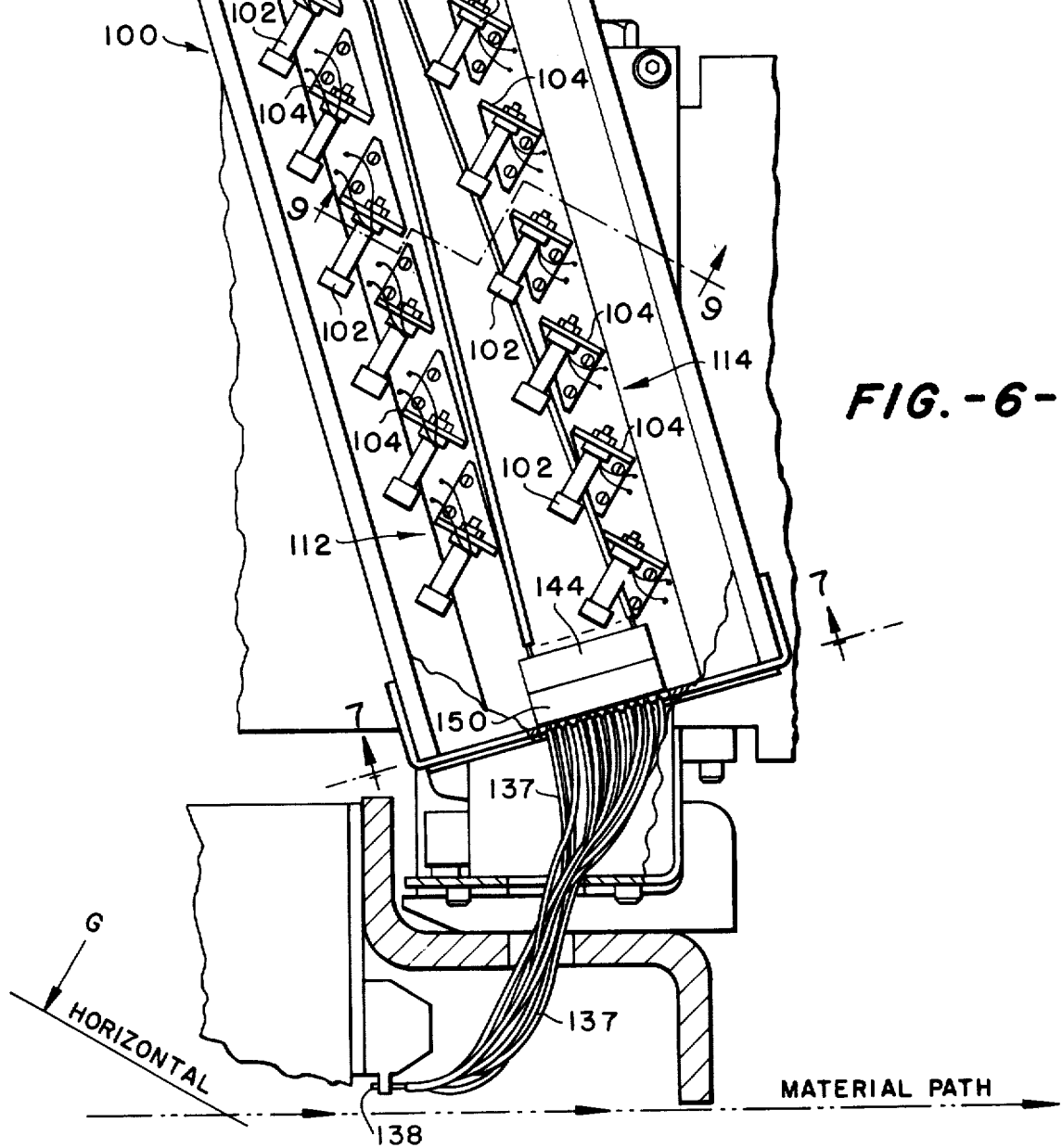
FIG.-6-

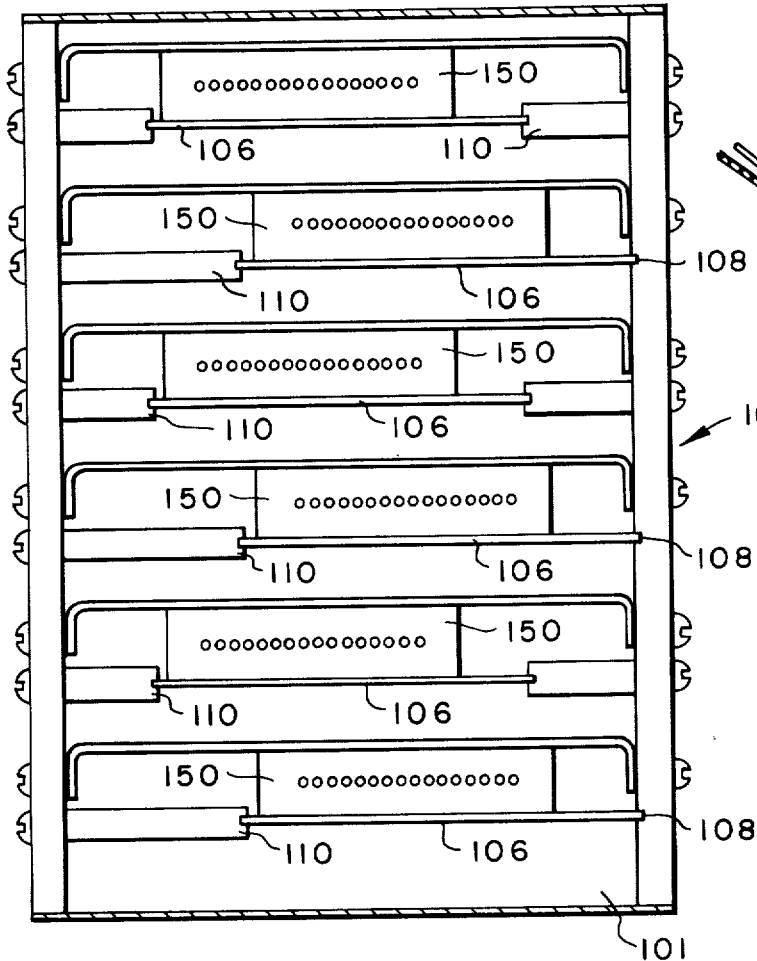
FIG.-7-
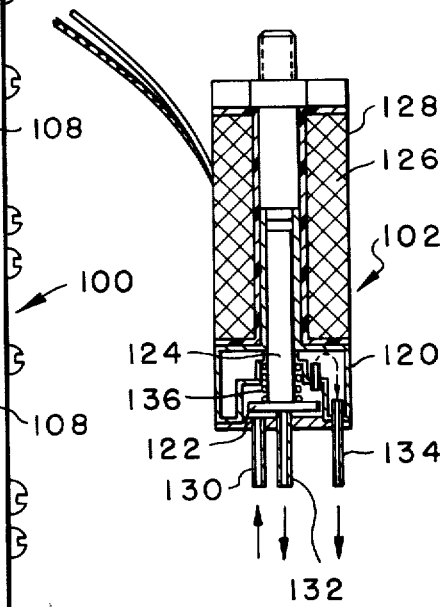
FIG.-10-
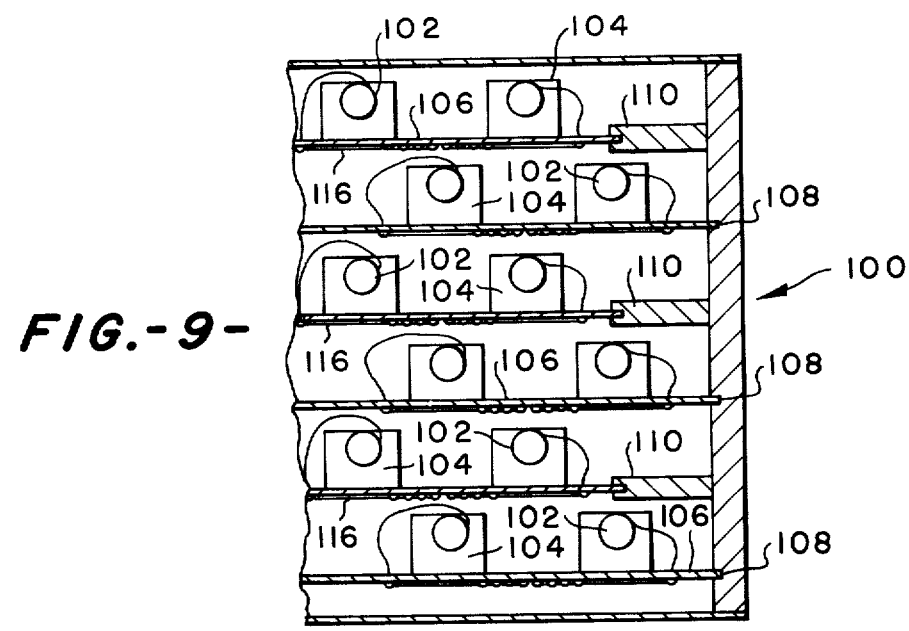
FIG.-9-

DYEING AND PRINTING OF MATERIALS

This is a continuation of application Ser. No. 493,186, filed July 30, 1974, now abandoned which is a continuation-in-part of application, Ser. No. 430,450, filed Jan. 3, 1974, now abandoned.

This invention relates to the application of dyestuffs and other liquids to textile materials and, more particularly, to the printing of textile fabrics having relatively porous surfaces, such as pile carpets.

Textile fibers and fabric materials have long been colored with natural and synthetic dyes, and, in particular, printed by color decoration of the surface or surfaces of the materials in definite repeated forms and colors to form a pattern. Such color printing of textile fabrics has been accomplished in various ways. Earlier forms of printing used carved blocks charged with colored paste pressed against the fabric. Subsequently, speed of printing was increased by development of roller printing wherein moving fabrics are sequentially contacted by engraved metal rollers each containing a different color dye to form the desired pattern thereon. Textile fabrics are also printed by sequential contact with screens each having a porous portion of a pattern and carrying a particular color dyestuff.

More recently, it has been proposed to print textile fabrics, including pile carpets, by the programmed spraying or jetting of plural colored dyes onto the surface of the moving fabric. Typical of such processes and apparatus are described in U.S. Pat. Nos. 3,570,275; 3,443,878; and British Pat. No. 978,452. Generally, such apparatus consists of a plurality of dye applicator bars or manifolds spaced along the direction of movement of the textile material and each containing multiple dye nozzles or jets extending transversely across the moving material. Each jet may be activated by suitable electric, pneumatic, or mechanical means to dispense dyes onto the moving material, and pattern control to apply the dyes in a desired sequence may be accomplished by various conventional programming devices, such as mechanical cams and drums, coded punch tapes, magnetic tapes, computers, and the like.

U.S. Pat. Nos. 3,443,878 and 3,570,275 disclose specific means for applying jets of dyes to print a fabric by use of continuously flowing dyestreams which are deflected by a stream of air or mechanical deflector to permit impingement of the dye stream upon the fabric or recirculation to a dye supply reservoir. Control of such systems to form printed patterns may be accomplished by various of the aforementioned programming and control means.

The apparatus of the present invention comprises a jet printing machine having a series of gun bars each containing plural dye jets extending across the width of an endless conveyor. The gun bars are spaced along the conveyor, and textile materials are carried by the conveyor past the gun bars where dyes are applied to form a pattern thereon. The application of dye from the individual dye jets in the gun bars may be controlled by suitable conventional pattern control means of the type heretofore mentioned.

The present invention deals with improvements in the jet printing of textile products including pile fabrics and, in particular, in the accurate placement of increments of dye at specific locations on and/or in the surface of the pile fabrics to improve the pattern definition in such fabrics.

The present invention will be better understood by reference to the accompanying drawings which disclose a specific embodiment of the invention, and wherein:

FIG. 3 is a schematic side elevation view of the jet dye applicator section seen in FIG. 2 and showing only a single jet gun bar of the applicator section and its operative connection to the dye supply system for the gun bar;

FIG. 4 is a more detailed perspective view of the jet gun bar seen in FIG. 3, and shows its operative connection to its dye supply system and the pattern control components of the apparatus;

FIG. 5 is an enlarged schematic sectional view of the gun bar of FIG. 4, taken generally along line 4—4 thereof;

FIG. 6 is an enlarged side elevation view of the valve-supporting section of one of the jet gun bars of the apparatus, with certain housing portions of the section removed to better show the arrangement and mounting of the valves therein;

FIG. 7 is a sectional view taken along line 7—7 of FIG. 6, showing the staggered offset arrangement of the valve support cards in the valve section, the valves not being shown, for convenience;

FIG. 8 is an enlarged fragmentary view of a plug-and-socket portion of the valve card seen in FIG. 6;

FIG. 9 is a sectional view of a portion of the valve section of FIG. 6, and taken generally along line 9—9 of the Figure; and FIG. 10 is a vertical section view of one of the electromagnetic air valves employed in the present invention.

Figure 1:
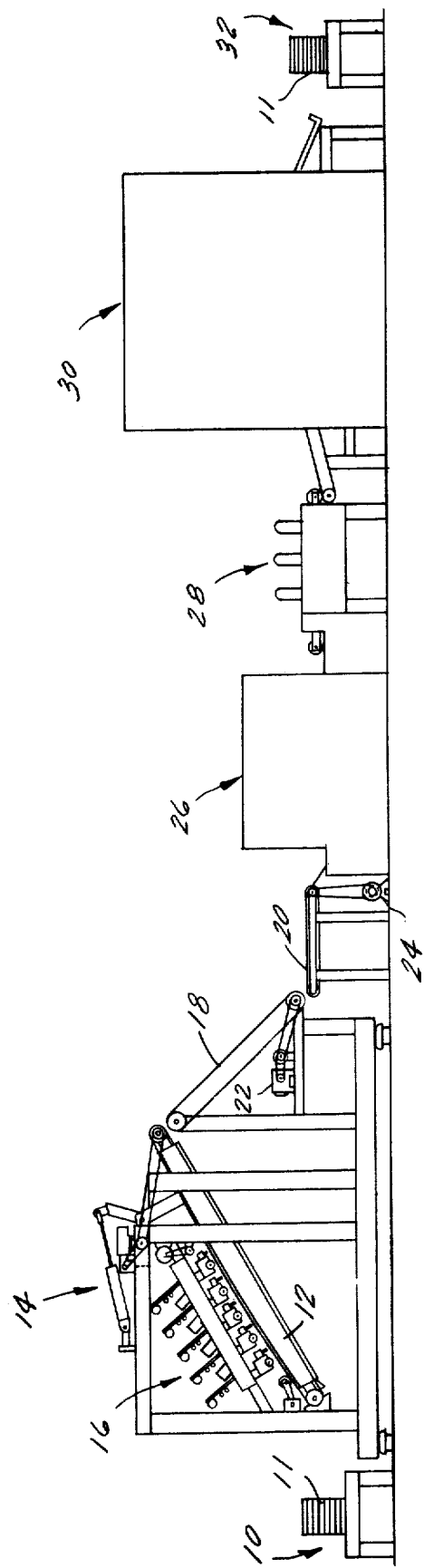
FIG. 1 is a schematic side elevation of apparatus for the jet dyeing and printing of textile materials.

Referring more specifically to the drawings, FIG. 1 shows a jet printing apparatus for printing textile materials, such as pile carpets, tiles, and the like. As seen, the apparatus consists of a supply table 10 from which a plurality of carpet tiles 11 are laid manually, or by suitable mechanical means, not shown, onto the lower end of an inclined conveyor 12 of a jet applicator section 14, where the tiles are suitably printed by the programmed operation of a plurality of jet gun bars, generally indicated at 16, which dispense streams of dye or other liquid onto the tiles during their passage. The printed tiles leaving the applicator section are moved by conveyors 18, 20 driven by motors 22, 24 to a steam chamber 26 where the tiles are subjected to a steam atmosphere to fix the dyes on the textile material. The printed tiles leaving steam chamber 26 are conveyed through a water washer 28 to remove excess unfixed dye from the tiles, and then pass through a hot air dryer 30 to a collection table 32 where the dried tiles are accumulated manually, or by suitable means, not shown, for subsequent use.

Figure 2:
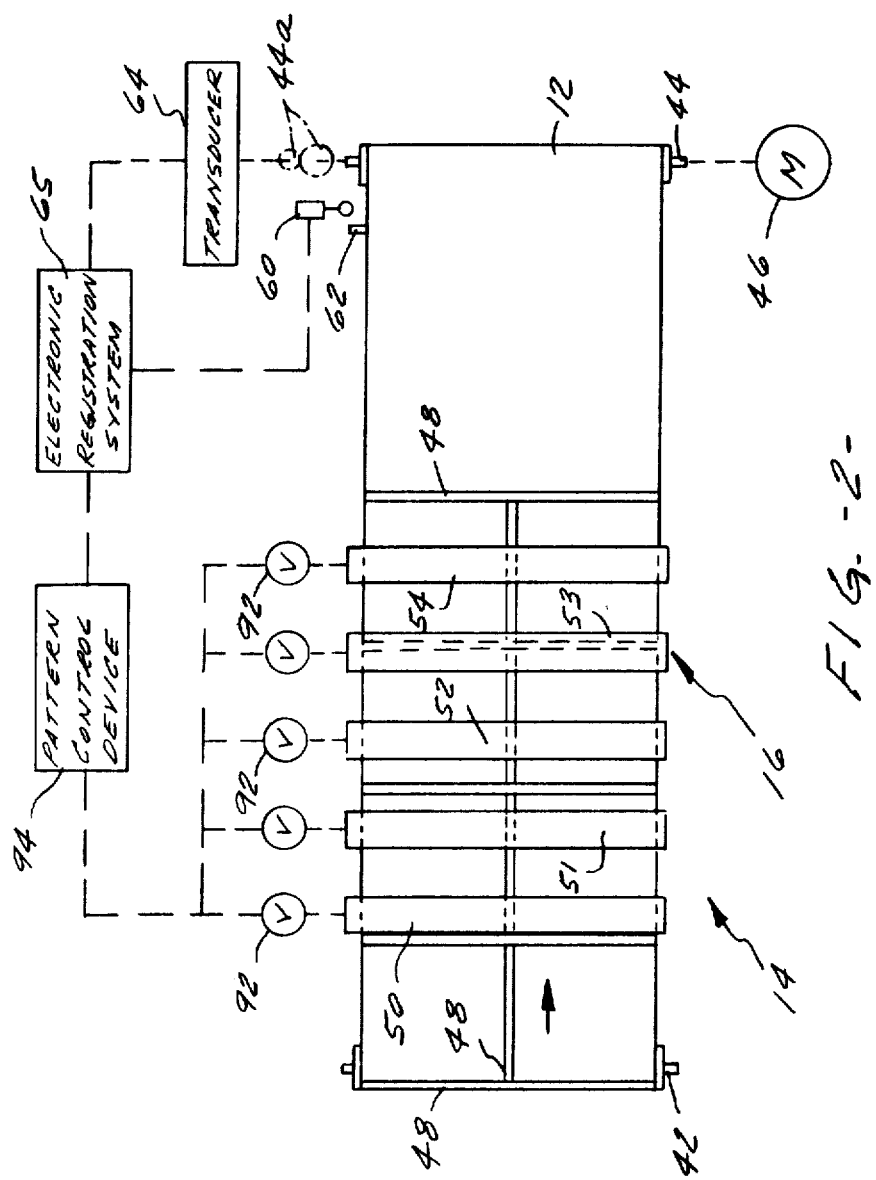
FIG. 2 is an enlarged schematic plan view of the jet dye applicator section of the apparatus of FIG. 1, showing in more detail the cooperative relation and operation of the conveyor with the jet gun bars.

Details of the apparatus of the present invention are further shown by reference to FIGS. 2-5. FIG. 2 is an enlarged schematic plan view of the jet applicator section 14 of FIG. 1 and shows the endless conveyor 12, the supporting chains and sprockets of which (not shown) are suitably supported for movement on rotatable shafts 42, 44, one of which, 44, is driven by motor means 46. For printing carpet tiles of rectangular or square shape, the surface of conveyor 12 is provided with a series of separator bars or spacers 48 which accurately position the tiles in spaced relation to each other on the supporting slats of the conveyor. During movement of the conveyor, the tiles pass sequentially adjacent and beneath substantially identical gun bars 16, five of which, 50–54, are shown schematically, spaced along the path of travel of the conveyor and extending across its full width.

As best seen in FIGS. 3 and 4 which show only the single gun bar 50, for sake of clarity, each gun bar contains a plurality of individual jet orifices 55 disposed along the bar and positioned to direct dyes in narrow streams toward the surface of the pile carpet tiles as they pass thereby. Each gun bar includes a dye supply manifold 56 communicating with the jet orifices 55 which are supplied with liquid dye from reservoir tank 57. Pump means 58 supplies liquid dye from reservoir tank 57 under pressure to manifold 56 and the jet orifices 55. During operation, liquid dye is expelled continuously in small streams or jets from the orifices 55 toward the material to be printed.

Positioned adjacent and at a riight angle to the outlet of each jet orifice is an outlet 90 of an air supply tube 91 (FIG. 5), each of which communicates with a separate solenoid valve 92 (FIG. 4). The solenoid valves, which are of the electrical to fluidic interface type, such as LIF 180D3A12 made by the Lee Co. of Westbrook, Conn., are supported as hereinafter described in the jet dye applicator section 14 and are supplied with air from an air compressor 93. Although the valves for each gun bar are shown in FIGS. 2 and 3 as a single valve symbol 92, for clarity, it is to be understood that a solenoid valve and individual air supply tube are provided for each jet orifice of each gun bar such that individual streams of dye can be individually controlled. The valves are controlled by a pattern control device or mechanism 94 to normally provide streams of air to impinge against the continuously flowing dye streams and deflect the same into a catch basin or trough 95 from which the dye is recirculated by conduit 95a to the dye reservoir tank 57. The pattern control device 94 for operating the solenoid valves comprises, in the present embodiment, a conventional computer device with magnetic tape transport for pattern information storage. Generally, for printing repeating patterns, the magnetic tape may be provided with a repeating sequence of information which is transmitted to the solenoid valves until a desired number of tiles have been printed. In the present case, a series of 10 tiles may be placed in spaced relation to each other on the conveyor belt and the pattern control device is initially activated as the leading edge of the first tile presents itself beneath the first gun bar 50. Information from the magnetic tape and computer is then fed to cut the solenoid valves off and on and sequentially print the tiles with the desired pattern as they pass beneath the sets of the gun bars.

In operation of the presently disclosed apparatus, with the pattern control device supplying no information, dye under pressure is continuously supplied in a stream from each jet orifice 55 toward the textile material to be printed. Every solenoid valve is normally open to supply streams of air to impinge against the continuously flowing dye streams and deflect them all into the troughs of the gun bars for recirculation. As the first of the series of tiles to be printed passes beneath the first gun bar and the pattern control device is actuated, certain of the normally open solenoid air valves are closed so that the corresponding dye streams are not deflected but impinge directly upon the textile material. Thus, by cutting on and off the solenoid air valves in a desired sequence, a printed pattern of dye is placed on the textile material during its passage.

It can be appreciated that in jet dyeing apparatus of the type described, it is desirable to utilize gun bars of relatively fine gauge, that is, gun bars having very closely spaced dye orifices to provide broad patterning capability and to permit intricate patterning of the materials to be printed. Also it is important to maintain closely spaced relation between the gun bars in order to minimize inaccuracies in the patterns as various colors are applied sequentially to the materials. In such systems wherein air streams are employed to deflect the continuously flowing dye streams to obtain the printed pattern, it becomes necessary and highly desirable to keep the air control valves in a compact, close relationship to each other and to the jet dye stream deflection points, not only in order to maintain short air lines and achieve faster control action, but also to permit the close spacing of consecutive gun bar assemblies.

It has been found that when electromagnetic air valves of the type hereinbefore described are employed in closely packed relationship to control the patterning air for the dye streams, the magnetic force fields created in adjacent electromagnetic valves tend to interfere with each other during operation and cause unscheduled interaction between the valves with resultant faults and flaws in the printed pattern on the material. By means of the highly compact and unique arrangement of the electromagnetic air control valves of the present invention, interference between valves is reduced to a minimum. In accomplishing this end, it has been found that the valves may be so located and positioned in closely packed arrangement that the lines of electromagnetic force emitted by each valve during its operation intersects the magnetic axis of each of its adjacent, or nearest neighbor valves at a generally right angle. More specifically, the valves are arranged in the valve section in a closely spaced, three dimensional lattice or geometric configuration with the magnetic axis of each of the valves generally parallel to each other, and with adjacent valves located at angles of approximately 35° – 55° from the magnetic axis of its nearest neighborvalves. Preferably, the valves are positioned at angles of 45° from the magnetic axis of their adjacent valves to form a generally cubic lattice.

The invention is best shown in and described by reference to FIGS. 6–10. Each of the dye jet gun bars is provided with a valve box 100 which may be composed of plural compartments 101 and which extends across the width of the gun bar to house a plurality of electromagnetic air valves 102, one valve for control of each dye stream of the bar, as previously described. As shown, the valves are mounted by brackets 104 on a plurality of rigid cards 106, which cards are positioned in closely spaced, side-by-side relation and are removably secured in the valve box 100 in opposed grooves 108 or guideway elements 110 located on the inside walls of the box. The cards form a base for the valves which are mounted in parallel rows 112, 114 on one side of each card. The other side of the card is provided with printed electrical circuitry 116 connecting each valve to a central electrical plug 118 on the upper end of the card. These electrical connections permit control of the valves during operation of the printing apparatus, with the plug 118 being attached by suitable electrical means to the pattern control device 94 (FIGS. 2-4).

As best seen in FIG. 10, each of the electromagnetic air valves 102 of the present invention is composed of a main body or casing 120 which encloses a movable, two position valve element 122 having a valve stem 124 which functions as the movable armature or plunger within the coil windings 126 of the solenoid portion 128 of the valve. The valve casing has an air supply inlet line 130 and two outlet lines 132, 134, and valve element 122 is moveable along the magnetic and central axis of the valve by activation of electromagnetic coil windings 126 and an opposing spring 136. As can be seen, valve element 122 is moveable to alternately open and close the inlet ports of the two outlet lines 132, 134, thus communicating the inlet line 130 to supply air (1) to deflect the dye streams (by way of outlet air lines 134, 140, 137 and air jet orifice 138), or (2) to bypass the air to the atmosphere (by way of outlet line 132) when the dye streams are not deflected but are applied to print the material.

As best seen in FIG. 6 the valves of adjacent rows 112, 114 on each card are staggered at 45° angles with respect to their adjacent valves in the opposite row. Similarly, and as best seen in FIGS. 7 and 9, each valve card 106 is supportably positioned by the valve box guideway elements 110 in a staggered, offset relation to its adjacent cards so that nearest valves on adjacent cards are correspondingly offset at 45° angles from each other. Thus, it can be seen that the valves are positioned in a three dimensional, generally cubic lattice whereby lines of electromagnetic force emitted by each valve during its operation intersects the magnetic axis of each of its adjacent or nearest neighbor valves at a generally right angle, thereby minimizing magnetic interference and false triggering of the valves during their operation.

To facilitate maintenance and operation of the valves, static friction may be minimized in the movable valve element by positioning the axis of the movable plunger 124 of each valve coincident with the direction of the force of gravity. Thus, as seen in FIG. 6 in which the vertical and the direction of the force of gravity is indicated by the arrow G, even though the valve box 100 is positioned at an angle, the individual valves 102 are mounted on the valve cards in vertical position so that their movable plungers are coincident with the direction of the force of gravity. Thus when the valves are operated, their movable plungers have minimum frictional drag caused by the force of gravity.

As previously mentioned, th solenoid valves 102 are electrically actuated through printed circuitry 116 on the opposite sides of the cards. The leads for the electrical circuitry are suitably connected in plug 118 on the card and the plug in turn connected to the pattern control device. Similarly, air lines from each valve, only two of which 140 have been shown, are connected to air distributor head 142 and plug 144 disposed at the end of the cards. Head 142 is attached to an air manifold 146 at the end of a removable air supply line 148 while plug 144 is connected to a socket 150 (FIGS. 6 and 8) from which the air lines 137 extend to the individual air jet orifices 138 adjacent the dye orifices of the gun bar. Thus replacement of the valves and valve cards is facilitated by the plug-and-socket arrangements described.

In this way a defective valve or valve card with defective circuitry may be easily replaced by unplugging the connections, removing air line 148, and sliding the card from its position in the guideways or grooves of the box.

Although the valve cards have been shown and described in the preferred embodiment of the present invention to be of a single identical type to simplify manufacture and replacement of the cards, it is to be understood that the valve cards could be of different dimensional configuration or the valves on adjacent cards could be offset in their spacial relationship rather than the cards being offset in the valve box, so long as the three dimensional geometric lattice arrangement of the valves is maintained to provide the desired right angle intersection of magnetic force lines with adjacent magnetic axes.

From the foregoing description, it can be appreciated that the present invention provides a novel arrangement of electromagnetically operated solenoid valves which facilitates ready replacement thereof while providing a compact valve arrangement in which magnetic interface is reduced to a minimum.

That which is claimed is:

1. A compact arrangement for valves for controlling fluid flow comprising a plurality of electrically operated solenoid valves, each of said valves having a magnetic coil and a magnetizable valve element mounted on the magnetic axes of the coil for movement therealong to activate the valve, and means supporting said valves in a compact, closely spaced, three dimensional lattice with the magnetic axis of each of the valves of said theee dimensional lattice being substantially parallel, each plane of said three dimensional lattice including therein at least three valves which are nonlinearly arranged therein, said valves of said three dimensional lattice being further characterized in that valves in one plane of said lattice are positioned intermediate the valves in the adjacent parallel plane of said lattice such that a straight line connecting like points on any of said valves to its nearest neighbor valves, either in a common plane or an adjacent plane, forms an angle, with the magnetic axis of such nearest neighbor valve of between 35° to 55° so that the magnetic forces emitted by any nearest neighbor valve crosses the magnetic axes of its nearest neighbor valves at about a right angle.

2. Apparatus as defined in claim 1 wherein said mounting means supporting said valves comprises at least two rigid cards.

3. Apparatus as defined in claim 2 wherein each card is provided with a printed electrical circuit thereon for supplying electrical energy to each of said valves.

4. Apparatus according to claim 3 wherein said means for supporting said valves further includes means for mounting said cards in generally parallel, spaced relation with adjacent cards offset in staggered relation.

5. Apparatus according to claim 4 wherein said valves are positioned on each of said cards such that a straight line connecting like points on any of said valves with its nearest neighbor valve forms an angle of about 45° with the magnetic axis of such nearest neighbor valve.

* * * * *